H. P. F. BEHRENS.
SPEED INDICATOR FOR MOTOR VEHICLES AND THE LIKE.
APPLICATION FILED JULY 6, 1911.
1,048,276.
Patented Dec. 24, 1912.
3 SHEETS—SHEET 1.
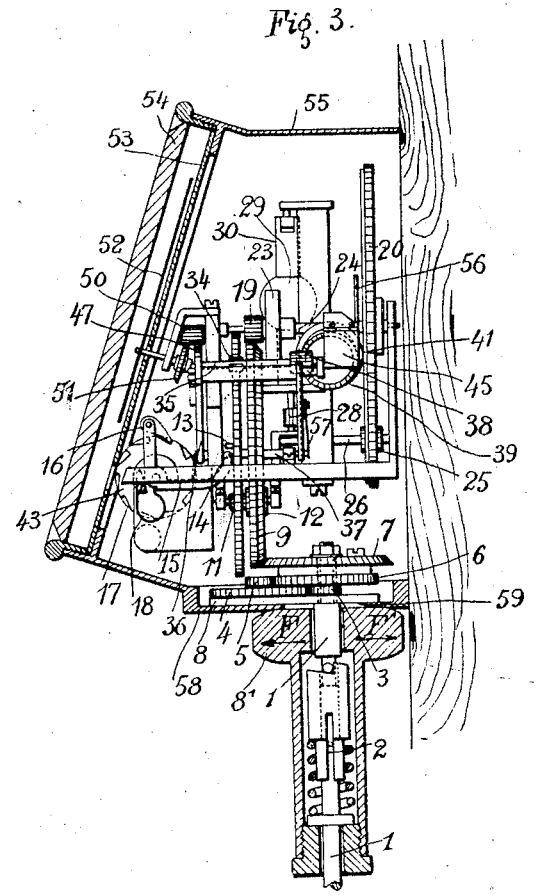
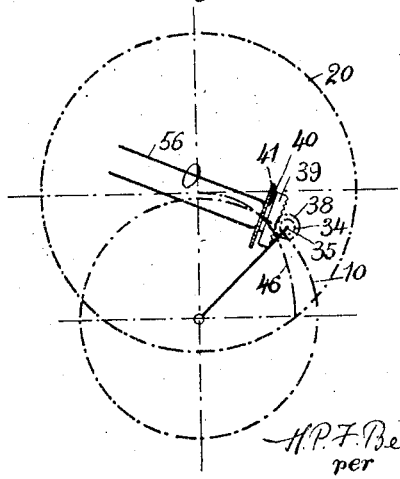

H. P. F. BEHRENS.
SPEED INDICATOR FOR MOTOR VEHICLES AND THE LIKE.
APPLICATION FILED JULY 6, 1911.
1,048,276.
Patented Dec. 24, 1912.
3 SHEETS—SHEET 2.
Fig. 2.
Fig. 5.
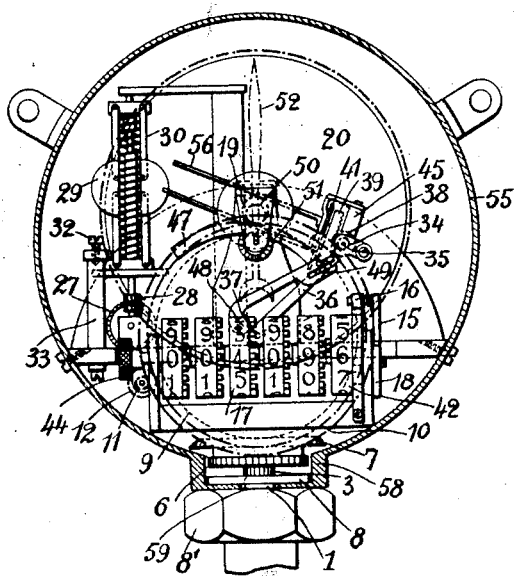
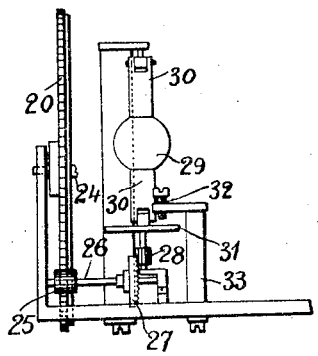
Fig. 6. Fig. 7.
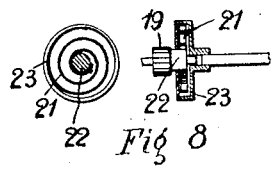
Fig. 4.
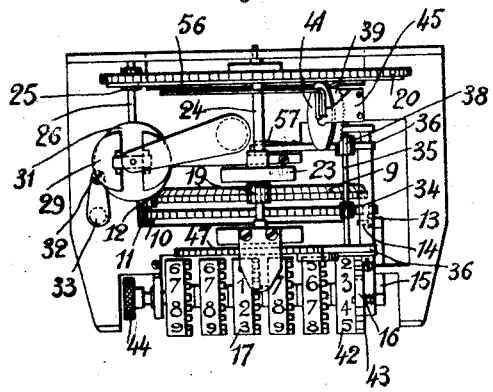
Fig. 8.
Fig. 9.
Witnesses:
K. O'Hara
S. Keeler
Inventor:
H. P. F. Behrens
per
Lawrence Langner.
Attorney.

H. P. F. BEHRENS.
SPEED INDICATOR FOR MOTOR VEHICLES AND THE LIKE.
APPLICATION FILED JULY 6, 1911.

1,048,276.

Patented Dec. 24, 1912.

3 SHEETS—SHEET 3.

Witnesses:

Inventor:
H. P. F. Behrens
per
Lawrence Langner.
Attorney.

UNITED STATES PATENT OFFICE.

HEINRICH PETER FRIEDRICH BEHRENS, OF PARIS, FRANCE.

SPEED-INDICATOR FOR MOTOR-VEHICLES AND THE LIKE.

1,048,276.     Specification of Letters Patent.     Patented Dec. 24, 1912.

Application filed July 6, 1911. Serial No. 637,239.

*To all whom it may concern:*

Be it known that I, HEINRICH PETER FRIEDRICH BEHRENS, a citizen of the Republic of France, and resident of Paris, France, post-office address 11 Rue de Crussol, have invented certain new and useful Improvements in Speed-Indicators for Motor-Vehicles and the Like; and I do hereby declare that the following is a full, clear, and exact description of the same.

The present invention has for its object a speedometer for automobile and other vehicles in which the index hand is driven by a roller rolling on a disk traveling at a constant speed, the distances from the center of this disk being proportionate to the speed of the vehicle and the variations of speed being transmitted to this roller by the intermediary of a planet pinion running on a toothed wheel driven by the vehicle. This indicator also comprises a distance meter.

The description which follows with reference to the accompanying drawing will render the construction of this speed indicator clearly intelligible.

Figure 10:
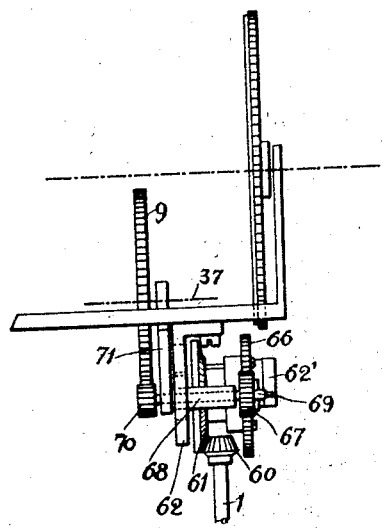
Figure 11:
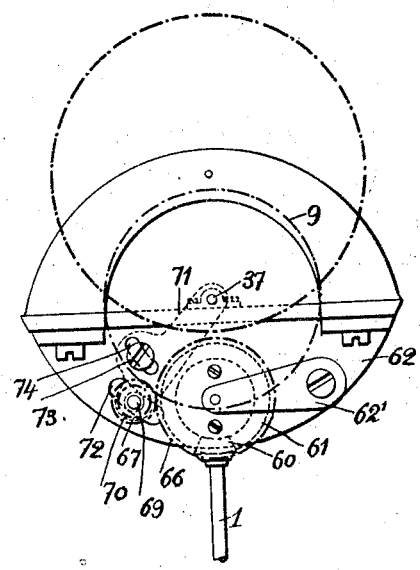
Figure 12:
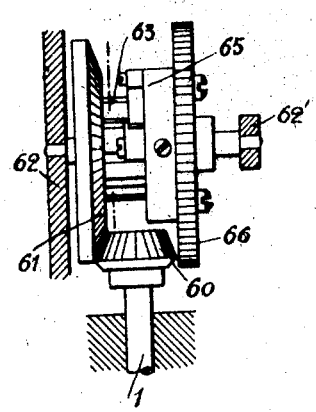
Figure 13:
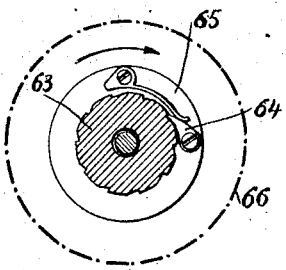

Figure 1 is a diagram explanatory of the operation. Fig. 2 is a front elevation of the mechanism with the casing in section. Fig. 3 is a side elevation of the same mechanism with the casing in section. Fig. 4 is a plan view of the same mechanism and Fig. 5 is a side elevation showing the control of the regulator system. Figs. 6, 7, 8 and 9 illustrate constructional details. Figs. 10, 11, 12 and 13 relate to a modification of the driving mechanism of the apparatus.

The movement of the vehicle or machine is transmitted to the indicator by a shaft 1 with the interposition of a clutch 2 and of the following speed reducing mechanism. A pinion 3 keyed upon the shaft 1 meshes with a wheel 4 upon the shaft of which there is keyed a pinion 5 meshing with a wheel 6 loose upon the shaft 1 and integral with the bevel pinion 7. The latter is detachable in such a manner that it may be changed in accordance with the diameter of the vehicle wheels.

The system of wheels 1, 2, 3, 4, 5 and 6 which carries the detachable wheel 7 is mounted on a plate 8 which is secured in the box containing the mechanism by means of a nut 8'. This system is able to slide in a slot 59 formed in the bottom 58 of the box 55 in the direction indicated by the arrows F and F' so as to permit of adjusting the wheel 7 relatively to the wheel 9. The pinion 7 is in mesh with a bevel wheel 9 driving another wheel 10 fast to the shaft 37 by the intermediary of two gearing down pinions 11 and 12. This wheel 10 carries a small snug 13 which at each revolution of the wheel, that is to say, after the vehicle has traversed 100 meters strikes upon a finger 14 integral with a rocking lever 15 carrying a pawl 16 driving the distance meter 17. A spring 18 returns the lever 15 into its initial position after the passage of the snug 13. The wheel 9 meshes with a small pinion 19 which transmits its movement to a disk 20 which can be driven at a constant speed by the intermediary of a friction clutch constituted (Figs. 6 and 7) by a spiral spring 21, the central extremity of which is attached to the extension 22 of the pinion 19, the end of this spring pressing upon the box 23 keyed upon the shaft 24 upon which the plate 20 is fixed. In order to render the movement absolutely uniform whatever the speed of the pinion 19 and consequently of the vehicle or machine driving the indicator may be the disk 20 is provided with external teeth which mesh with a pinion 25 (Fig. 5) keyed upon a shaft 26 carrying a spur wheel 27 meshing with a pinion 28 controlling a centrifugal governor 29 of any suitable kind; in the governor represented the balls 29 in separating cause a plate 31 to ascend by means of the small rods 30; this plate comes into frictional contact with a bearing screw 32 carried by an angle piece 33. The wheel 10 meshes with a small planet pinion 34 keyed on a shaft 35 carried by two parallel arms 36 able to rotate freely on the shaft 37 of the wheels 10 and 9. The shaft 35 carries another pinion 38 meshing with a spur wheel 39 keyed on a small shaft 40 upon which the roller 41 is fixed; this roller runs upon the constant speed plate 20. This plate is covered with leather or other adherent material 41ª and the roller is provided with ratchet wheel teeth (Fig. 8) these teeth being rounded off laterally as shown in section in Fig. 9 so as to enable the roller to slide laterally when it separates from or approaches the center of the disk 20 during variations of speed without injuring the adherent surface of the disk 20.

For resetting the first wheel 42 of the totalizer at zero the ratchet 43 is mounted with considerable friction upon its shaft and the first numbered wheel 42 is keyed upon the said shaft so that by rotating this same shaft by means of the knurl 44 the wheel 43 can be given the desired position although the ratchet is locked by its pawl. This arrangement presents the advantage of rendering it unnecessary to lift the pawl in order to release the ratchet.

The operation of this apparatus is as follows:—As already explained the shaft 1 driven by the vehicle drives the two toothed wheels 9 and 10 by means of its gears. The wheel 9 drives the disk 20; which moves at a constant speed owing to the action of the centrifugal governor. The wheel 10 which runs at a speed proportionate to the speed of the vehicle or machine imparts to the planet pinion 34 and consequently to the roller 41 a higher or lower speed by the intermediary of the pinion 38 and wheel 39. Now for a given speed of the wheel 10 the roller runs upon a circle of given radius. If the speed of the wheel 10 should increase, as the roller rotates at a higher speed, it must run upon a circle of larger radius, because the disk 20 always turns at a constant speed. If on the other hand the speed of the wheel 10 is smaller, the roller will run upon a circle of smaller radius. Consequently the roller and the planet pinion 34 that it carries tend to separate more or less from the center of the disk 20 and a given speed of the wheel 10 and of the vehicle corresponds to a given interval from the center 0 (Fig. 1).

For the different positions that it occupies for the various speeds, the point of contact of the roller 41 does not describe a circle concentric with that of the wheel 10, that is to say with that of the center of the planet pinion 34, because its support 45 pivots upon a shaft in line with the shaft 35, in such a manner as to enable the plane of the roller to assume oblique positions as just explained, but, as shown in the diagrammatic Fig. 1, a curve 46 which is comprised within the circle 10.

In order to guide the roller 41 efficiently and insure its running upon concentric circles, it is provided with a kind of fork 56 which embraces the shaft 24 of the disk 20. This method of guidance also permits the plane of the roller 41 to assume an oblique position upon the radius which joins its point of contact to the center, in such a manner as to pass obliquely from one circumference to another, during the variations of speed.

The adherence of the roller 41 upon the disk 20 is insured by a spring 57 which bears upon the end of the shaft 37 upon which the frame constituted by the two arms 36 is able to turn freely, this frame serving as support for the planet pinion and for the roller fittings and presents some little axial play upon this shaft 37.

In order to permit of recording the speed exactly, a toothed sector 47 the center 48 of which is eccentric relatively to the center 37 of the wheel 10 is connected by a slot 49 with the arm 36 which imparts to it the displacements effected by the roller 41 and by the shaft 35, so that the first right hand tooth of the said sector 47 describes a curve which coincides almost exactly with the real curve described by the point of contact of the roller 41 and so that the arcs described by the said tooth are practically equal or proportional to those described by the roller. This toothed sector 47 meshes with a pinion 50 which imparts its movement to a small bevel pinion 51 upon the shaft of which the hand 52 is mounted; this hand moves over the dial 53 beneath the glass 54 in the box 55 which contains the whole of the mechanism.

As will be understood, this speed indicator might equally well be employed for measuring at any time the speeds of engines running at variable speeds.

Instead of the driving mechanism described at the commencement of the specification the following device illustrated in Figs. 10, 11, 12 and 13 might equally well be employed.

The driving shaft 1 carries a bevel pinion 60 which meshes with a bevel pinion 61 mounted at the lower part of the apparatus between a fixed plate 62 and a movable plate 62' which pinion 61 carries a ring of teeth forming a ratchet 63 which acts upon a pawl 64 integral with a plate 65 upon which a toothed wheel 66 can be detachably fixed. This wheel 66 meshes with a small pinion 67 mounted in a sleeve 68 in the interior of which its shaft 69 is able to rotate; at its extremity this shaft carries another small pinion 70 meshing with the wheel 9. The sleeve 68 is carried by an arm 71 which is rockably mounted to rotate around the shaft 37 of the wheel 9 and the said sleeve is able to move in a slot 72 concentric with the shaft 37. This arrangement also permits of changing the multiplication in such a manner as to adapt the speed indicator to the diameter of the wheels of the vehicle. After the plate 62' has been dismounted it is only necessary to remove the wheel 66, to replace it by one of larger or smaller diameter. The sleeve 6 with the pinion 67 is then returned to the proper position for bringing it into mesh with the fresh wheel 66. When this has been done, the arm 71 is locked by tightening the screw 73 engaged in the slot 74. It will be noted that the driving by this system can take place in one direction only owing to the form of pawl and ratchet interposed between the bevel wheel 61 and the toothed wheel 66.

What I claim and desire to secure by Letters Patent of the United States is:—

1. A speed indicator comprising in combination, a disk, means for rotating said disk at a constant speed, means adapted to move over and contact with the face of said disk, indicating means, means for operatively connecting said indicating means with said contacting means, and driving means for said contacting means comprising a planet wheel and a toothed wheel in engagement therewith rotating at speeds proportionate to the speeds to be indicated.

2. A speed indicator comprising in combination, a disk, means for rotating said disk at a constant speed, means adapted to move over and contact with the face of said disk, indicating means, means for operatively connecting said indicating means with said contacting means, and driving means for said contacting means comprising a planet wheel, a toothed wheel in engagement therewith and rotating at speeds proportionate to the speeds to be indicated, a frame for said planet wheel consisting of arms capable of rocking movement, and toothed rotating means for transmitting the rotation of said wheel to said contacting means.

3. A speed indicator including a constant speed disk and a roller member adapted to move over the face of said disk, a planet pinion, a toothed wheel driving said planet pinion, means for operatively connecting said pinion with said roller member, a shaft for said pinion, a support for said roller member, and a pivot for said support located in alinement with said pinion shaft.

4. A speed indicator including a shaft, a constant speed disk mounted thereon, a roller member adapted to move over the face of said disk, means to drive said roller member at speeds proportionate to the speeds to be indicated, and means to guide said roller member including a bifurcated member connected to said roller member and embracing the shaft of said constant speed disk.

5. A speed indicator comprising in combination, a disk, means for rotating said disk at a constant speed, means adapted to move over and contact with the face of said disk, indicating means, a toothed wheel rotating at speeds proportionate to the speeds to be indicated, a planet pinion running on said toothed wheel, a frame consisting of rockable arms in which said planet pinion is mounted, a driving connection between said planet pinion and the contacting means, a toothed member adapted to oscillate around an axis eccentric to that of said toothed wheel, means to transmit the movements of said frame to said toothed member, and means to transmit the movements of said toothed member to said indicating means.

6. A speed indicator comprising in combination, a disk, means adapted to move over and contact with the face of said disk, indicating means, means for operatively connecting said indicating means with said contacting means, driving means for said contacting means comprising a planet wheel, a toothed wheel in engagement therewith and rotating at speeds proportionate to the speeds to be indicated, and a centrifugal governor which regulates said disk for a constant speed.

7. Speed indicating and totalizing mechanism, comprising in combination a disk, means for rotating said disk at a constant speed, means adapted to move over and contact with the face of said disk, indicating means, means for operatively connecting said indicating means with said contacting means, driving means for said contacting means including a toothed wheel rotating at speeds proportionate to the speeds to be indicated, totalizer actuating means carried by said toothed wheel, a pawl actuated by said means, a ratchet, a shaft upon which said ratchet is frictionally mounted and adapted to be driven by said pawl, a totalizing wheel keyed upon said shaft, and means whereby the totalizing wheel can be reset to zero without releasing said ratchet from said pawl, by turning said shaft.

8. A speed indicator comprising a disk and means adapted to move over and contact with the face thereof, indicating means, means for operatively connecting said indicating means with said contacting means and driving means for said disk comprising a bevel pinion driven at the same speed as that to be indicated, a bevel wheel meshing with said bevel pinion, ratchet teeth on said bevel wheel, a pawl engaging with said ratchet, a toothed wheel operatively connected with said pawl, and gearing transmitting the movement of said toothed wheel to said disk.

9. A driving device for a speed indicator including a detachable toothed wheel adapted to be rotated at speeds proportionate to the speeds to be indicated, a second toothed wheel adapted to be driven by said detachable toothed wheel, and a transmission between said two toothed wheels comprising a shaft mounted in an arm rockable around the shaft of said second toothed wheel, two toothed pinions on said shaft one meshing with the detachable toothed wheel, and the other with said other toothed wheel, and means for retaining said arm in a determined position.

In witness whereof, I have hereunto signed my name in the presence of two subscribing witnesses.

HEINRICH PETER FRIEDRICH BEHRENS.

Witnesses:
H. C. COXE,
GABRIEL BELLIARD.